US012188372B2

(12) United States Patent
Nam

(10) Patent No.: US 12,188,372 B2
(45) Date of Patent: Jan. 7, 2025

(54) TURBINE BLADE AND GAS TURBINE INCLUDING THE SAME

(71) Applicant: DOOSAN ENERBILITY CO., LTD., Changwon (KR)

(72) Inventor: Gyeong Mo Nam, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/328,851

(22) Filed: Jun. 5, 2023

(65) Prior Publication Data

US 2023/0417144 A1 Dec. 28, 2023

(30) Foreign Application Priority Data

Jun. 23, 2022 (KR) ........................ 10-2022-0076650

(51) Int. Cl.
*F01D 5/18* (2006.01)

(52) U.S. Cl.
CPC .......... *F01D 5/186* (2013.01); *F05D 2250/14* (2013.01); *F05D 2250/52* (2013.01); *F05D 2250/712* (2013.01); *F05D 2260/202* (2013.01)

(58) Field of Classification Search
CPC ............... F01D 5/186; F05D 2240/127; F05D 2250/14; F05D 2250/52; F05D 2250/71; F05D 2250/711; F05D 2250/712; F05D 2260/2212
See application file for complete search history.

(56) References Cited

U.S. PATENT DOCUMENTS

| | | | | |
|---|---|---|---|---|
| 6,547,524 B2 * | 4/2003 | Kohli | F01D 5/186 415/115 |
| 8,584,470 B2 * | 11/2013 | Zelesky | F23R 3/06 415/115 |
| 8,628,293 B2 * | 1/2014 | Ramachandran | F01D 5/186 415/115 |
| 10,386,069 B2 * | 8/2019 | Pearson | F23R 3/06 |
| 11,220,917 B1 * | 1/2022 | Quach | F01D 5/284 |
| 2013/0209236 A1 | 8/2013 | Xu | |
| 2015/0184517 A1 | 7/2015 | Smith | |
| 2016/0061451 A1 | 3/2016 | Dudebout | |

(Continued)

FOREIGN PATENT DOCUMENTS

| | | |
|---|---|---|
| CN | 105909318 A | 8/2016 |
| JP | 2001012204 A | 1/2001 |

(Continued)

*Primary Examiner* — Courtney D Heinle
*Assistant Examiner* — Danielle M. Christensen
(74) *Attorney, Agent, or Firm* — Harvest IP Law, LLP

(57) ABSTRACT

Disclosed herein is a turbine blade having a leading edge, a trailing edge, a pressure side, and a suction side and having a cooling passage formed therein. The turbine blade includes a plurality of cooling holes formed on the pressure side or the suction side. Each of the cooling holes includes, a through-hole having a circular cross-section and angled outwardly toward the pressure side or the suction side from the cooling passage, a circular sink formed concavely with respect to the pressure side or the suction side in the vicinity of an upstream side of an exit of the through-hole, and an elliptical sink formed concavely with respect to the pressure side or the suction side in the vicinity of a downstream side of the exit of the through-hole.

16 Claims, 10 Drawing Sheets

(56) References Cited

U.S. PATENT DOCUMENTS

| | | | |
|---|---|---|---|
| 2016/0177733 | A1 | 6/2016 | Lewis |
| 2017/0089579 | A1 | 3/2017 | Bunker |
| 2022/0034230 | A1 | 2/2022 | Ikehara |

FOREIGN PATENT DOCUMENTS

| | | | |
|---|---|---|---|
| KR | 10-1303831 | B1 | 8/2013 |
| KR | 1020190042866 | A | 4/2019 |
| KR | 10-2000837 | B1 | 7/2019 |

* cited by examiner

TURBINE BLADE AND GAS TURBINE INCLUDING THE SAME

CROSS-REFERENCE TO RELATED APPLICATION

This application claims priority to Korean Patent Application No. 10-2022-0076650, filed on Jun. 23, 2022, the disclosure of which is incorporated herein by reference in its entirety.

BACKGROUND

Technical Field

Exemplary embodiments relate to a turbine blade and a gas turbine including the same, and more particularly, to a turbine blade having enhanced cooling performance by a plurality of film cooling holes improved in shape, and a gas turbine including the same.

Related Art

Turbines are machines that obtain a rotational force by impingement or reaction force using the flow of a compressible fluid such as steam or gas. Examples of the turbines include a steam turbine using steam, a gas turbine using hot combustion gas, and so on.

Among them, the gas turbine largely includes a compressor, a combustor, and a turbine. The compressor has an air inlet for introduction of air thereinto, and includes a plurality of compressor vanes and compressor blades alternately arranged in a compressor casing.

The combustor supplies fuel to air compressed by the compressor and ignites a mixture thereof with a burner to produce high-temperature and high-pressure combustion gas.

The turbine includes a plurality of turbine vanes and turbine blades alternately arranged in a turbine casing. In addition, a rotor is disposed to pass through the centers of the compressor, the combustor, the turbine, and an exhaust chamber.

The rotor is rotatably supported at both ends thereof by bearings. The rotor has a plurality of disks fixed thereto, and blades are connected to each of the disks while a drive shaft of, e.g., a generator, is connected to the end of the exhaust chamber.

The gas turbine is advantageous in that consumption of lubricant is extremely low due to the absence of mutual friction parts such as a piston-cylinder since it does not have a reciprocating mechanism such as a piston in a four-stroke engine, the amplitude, which is a characteristic of reciprocating machines, is greatly reduced, and it enables high-speed motion.

The operation of the gas turbine may be summarized as follows: The air compressed by the compressor is mixed with fuel so that the mixture thereof is burned to produce hot combustion gas, and the produced combustion gas is injected into the turbine. The injected combustion gas generates a rotational force while passing through the turbine vanes and turbine blades, thereby allowing the rotor to rotate.

SUMMARY

Aspects of one or more exemplary embodiments provide a turbine blade having enhanced cooling performance by a plurality of film cooling holes improved in shape, and a gas turbine including the same.

Additional aspects will be set forth in part in the description which follows and, in part, will become apparent from the description, or may be learned by practice of the exemplary embodiments.

According to an aspect of an exemplary embodiment, there is provided a turbine blade that has a leading edge, a trailing edge, a pressure side, and a suction side and having a cooling passage formed therein. The turbine blade includes a plurality of cooling holes formed on the pressure side or the suction side. Each of the cooling holes includes, a through-hole having a circular cross-section and angled outwardly toward the pressure side or the suction side from the cooling passage, a circular sink formed concavely with respect to the pressure side or the suction side and located in a first position that includes an upstream side of an exit of the through-hole, and an elliptical sink formed concavely with respect to the pressure side or the suction side and located in a second position that includes a downstream side of the exit of the through-hole.

The through-hole may be inclined at an angle of 30 to 60 degrees with respect to the pressure side or the suction side.

The first circular sink may include a concave curved part formed concavely around the upstream side of the exit of the through-hole and having an arc rim, and a curved connection part connected to the elliptical sink from one side of the first concave curved part.

An upstream edge where the first concave curved part meets an upstream surface may be bent to create a vortex.

The elliptical sink may have a major axis perpendicular to a direction of flow of fluid.

The elliptical sink may include a second concave curved part formed concavely around the downstream side of the exit of the through-hole and having an elliptical rim, and a convex curved part connected to a downstream surface from the elliptical rim of the second concave curved part.

The circular sink may have a diameter that is larger than a minor axis and smaller than a major axis of the elliptical sink.

The major axis of the elliptical sink may be 3 to 4 times the diameter of the through-hole.

A lowest depth point of the elliptical sink from the surface of the turbine blade may be deeper than a lowest depth point of the circular sink from the surface of the turbine blade.

According to an aspect of another exemplary embodiment, there is provided a gas turbine that includes a compressor configured to suck and compresses outside air, a combustor configured to mix fuel with the air compressed by the compressor to burn a mixture thereof, and a turbine having turbine blades mounted in a turbine casing, the turbine blades being rotated by combustion gas discharged from the combustor. Each of the turbine blades includes a plurality of cooling holes formed on a pressure side or a suction side. Each of the cooling holes includes a through-hole having a circular cross-section and angled outwardly toward the pressure side or the suction side from a cooling passage, a circular sink formed concavely with respect to the pressure side or the suction side and located in a first position that includes an upstream side of an exit of the through-hole, and an elliptical sink formed concavely with respect to the pressure side or the suction side and located in a second position that includes a downstream side of the exit of the through-hole.

The through-hole may be inclined at an angle of 30 to 60 degrees with respect to the pressure side or the suction side.

The circular sink may include a first concave curved part formed concavely around the upstream side of the exit of the through-hole and having an arc rim, and a curved connection part connected to the elliptical sink from one side of the first concave curved part.

An upstream edge where the first concave curved part meets an upstream surface may be bent to create a vortex.

The elliptical sink may have a major axis perpendicular to a direction of flow of fluid.

The elliptical sink may include a second concave curved part formed concavely around the downstream side of the exit of the through-hole and having an elliptical rim, and a convex curved part connected to a downstream surface from the elliptical rim of the second concave curved part.

The circular sink may have a diameter that is larger than a minor axis and smaller than a major axis of the elliptical sink.

The major axis of the elliptical sink may be 3 to 4 times the diameter of the through-hole.

A lowest depth point of the elliptical sink from the surface of the turbine blade may be deeper than a lowest depth point of the circular sink from the surface of the turbine blade.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
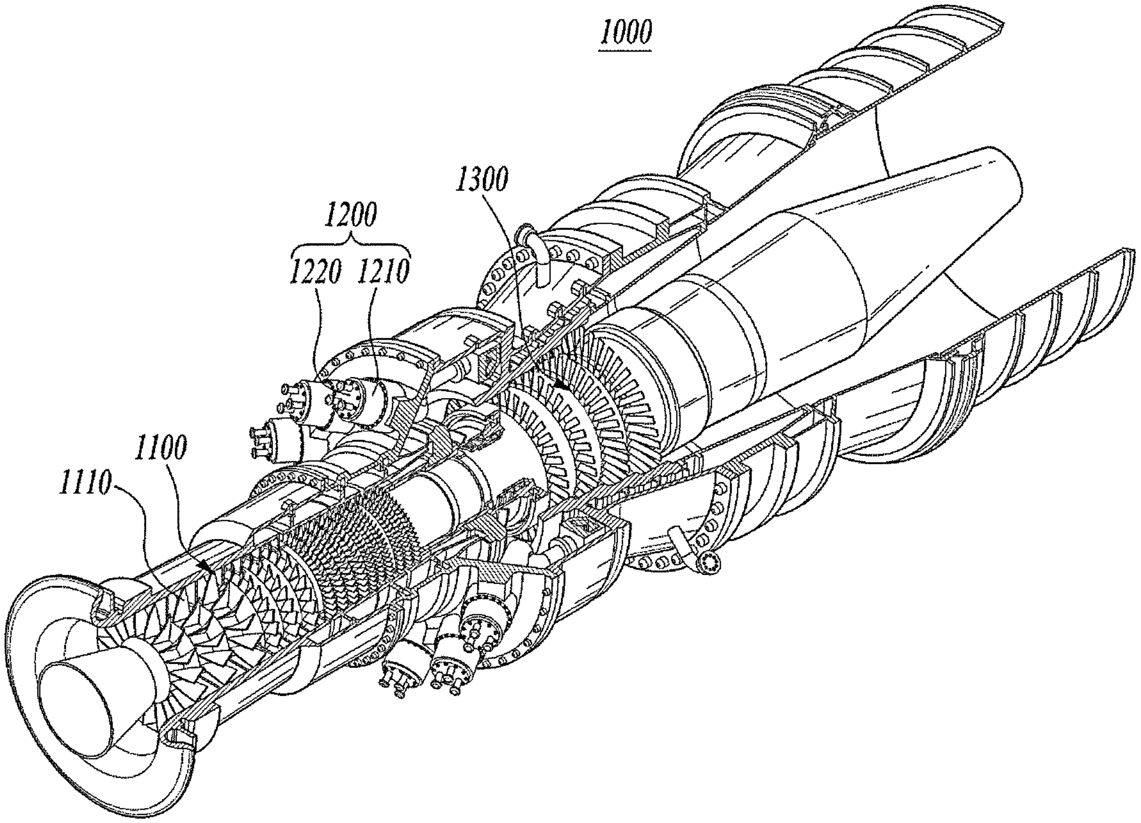
FIG. 1 is a partial cutaway perspective view illustrating a gas turbine according to an exemplary embodiment.

Various modifications and different embodiments will be described in detail with reference to the accompanying drawings so that those skilled in the art can easily carry out the disclosure. It should be understood, however, that the various embodiments are not for limiting the specific embodiments, but they should be interpreted to include all modifications, equivalents or substitutions of the embodiments included within the spirit and scope disclosed herein.

The terminology used herein is for the purpose of describing specific embodiments only and is not intended to limit the scope of the disclosure. As used herein, the singular forms “a”, “an” and “the” are intended to include the plural forms as well, unless the context clearly indicates otherwise. In the disclosure, terms such as “comprises”, “includes”, or “have/has” should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Figure 2:
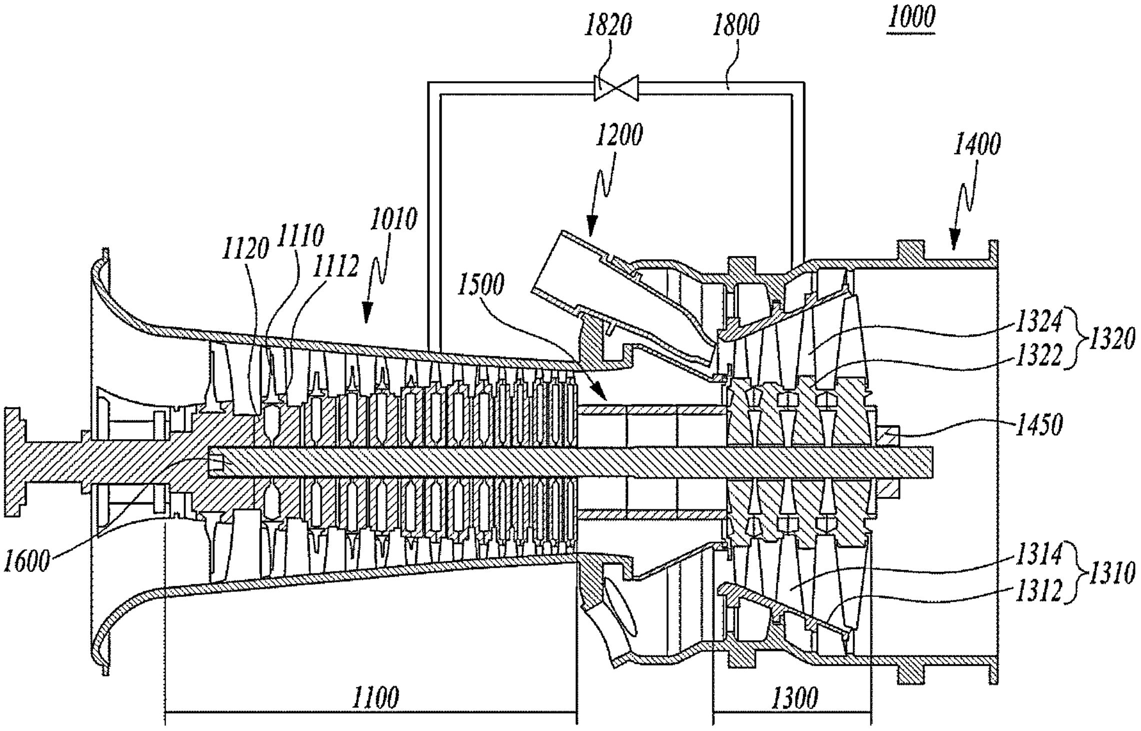
FIG. 2 is a cross-sectional view illustrating a schematic structure of the gas turbine according to the exemplary embodiment.
Figure 3:
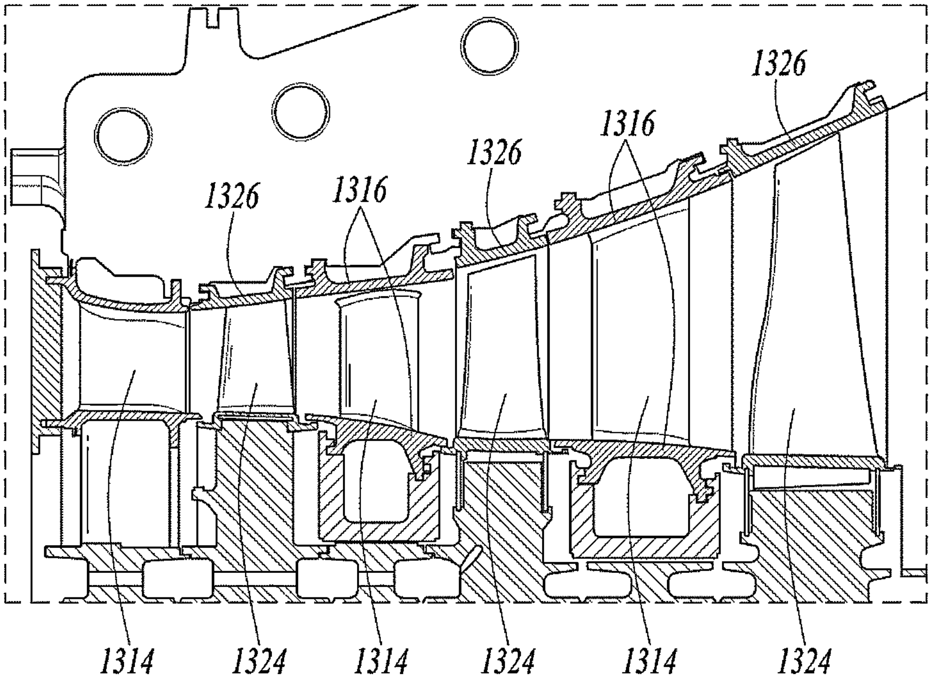
FIG. 3 is a partial cross-sectional view illustrating an internal structure of the gas turbine according to the exemplary embodiment.

FIG. 1 is a partial cutaway perspective view illustrating a gas turbine according to an exemplary embodiment. FIG. 2 is a cross-sectional view illustrating a schematic structure of the gas turbine according to the exemplary embodiment. FIG. 3 is a partial cross-sectional view illustrating an internal structure of the gas turbine according to the exemplary embodiment.

Referring to FIG. 1, the gas turbine 1000 according to the exemplary embodiment includes a compressor 1100, a combustor 1200, and a turbine 1300. The compressor 1100 includes a plurality of blades 1110 arranged radially. The compressor 1100 rotates the blades 1110 so that air is compressed and flows by the rotation of the blades 1110. The sizes and installation angles of the blades 1110 may vary depending on the installation positions of the blades 1110. The compressor 1100 may be directly or indirectly connected to the turbine 1300 to receive a portion of the power generated by the turbine 1300 to rotate the blades 1110.

Air compressed by the compressor 1100 flows to the combustor 1200. The combustor 1200 includes a plurality of combustion chambers 1210 and fuel nozzle modules 1220 arranged annularly.

Referring to FIG. 2, the gas turbine 1000 includes a housing 1010 and a diffuser 1400 which is disposed on a rear side of the housing 1010 to discharge a combustion gas passing through the turbine. The combustor 1200 is disposed in front of the diffuser 1400 to combust compressed air supplied thereto.

Based on a flow direction of air, the compressor 1100 is located at an upstream side of the housing 1010, and the turbine 1300 is located on a downstream side. A torque tube unit 1500 is disposed as a torque transmission member between the compressor 1100 and the turbine 1300 to transmit the rotational torque generated in the turbine 1300 to the compressor 1100.

The compressor 1100 includes a plurality of compressor rotor disks 1120 (e.g., 14 disks), each of which is fastened by a tie rod 1600 to prevent axial separation thereof.

Specifically, the compressor rotor disks 1120 are axially aligned in such a way that the tie rod 1600 constituting a rotary shaft passes through central portion thereof. Here, adjacent compressor rotor disks 1120 are disposed so that facing surfaces thereof are in tight contact with each other by the tie rod 1600. The adjacent compressor rotor disks 1120 cannot rotate relative to each other because of this arrangement.

Each of the compressor rotor disks 1120 has a plurality of blades 1110 radially coupled on the outer peripheral surface thereof. Each of the blades 1110 has a dovetail part 1112 fastened to the compressor rotor disk 1120.

A plurality of compressor vanes are fixedly arranged between each of the compressor rotor disks 1120. While the compressor rotor disks 1120 rotate along with a rotation of the tie rod 1600, the compressor vanes fixed to the housing 1010 do not rotate. The compressor vane guides a flow of compressed air moved from front-stage compressor blades 1110 of the compressor rotor disk 1120 to rear-stage compressor blades 1110 of the rotor disk 1120.

The dovetail part 1112 may be fastened in a tangential type or axial type, which may be selected according to the structure required for the gas turbine used. This type may have a dovetail shape or fir-tree shape. In some instances, the blades may be fastened to the compressor rotor disk 1120 by using other types of fasteners such as keys or bolts.

The tie rod 1600 is disposed to pass through the center of the plurality of compressor rotor disks 1120 and turbine rotor disks 1322. The tie rod 1600 may be a single tie rod or consist of a plurality of tie rods. One end of the tie rod 1600 may be fastened to the compressor rotor disk that is disposed at the most upstream side, and the other end thereof may be fastened by a fixing nut 1450.

The tie rod 1600 may have various shapes depending on the structure of the gas turbine, and is not limited to example shown in FIG. 2. For example, a single tie rod may be disposed to pass through central portions of the rotor disks, a plurality of tie rods may be arranged circumferentially, or a combination thereof may be used.

Also, a deswirler serving as a guide vane may be installed at the rear stage of the diffuser in order to adjust a flow angle of a pressurized fluid entering a combustor inlet to a designed flow angle.

The combustor 1200 mixes fuel with the compressed air introduced thereinto and burns a mixture thereof to produce high-temperature and high-pressure combustion gas, and increases the temperature of the combustion gas to a heat-resistant limit that the combustor and the turbine components can withstand through an isobaric combustion process.

A plurality of combustors may be arranged in the housing in the form of a shell. Each of the combustors may include a burner having a fuel injection nozzle and the like, a combustor liner defining a combustion chamber, and a transition piece as a connection between the combustor and the turbine.

The combustor liner provides a combustion space in which the fuel injected by the fuel injection nozzle is mixed with the compressed air supplied from the compressor and the fuel-air mixture is combusted. The combustor liner may include a flame canister providing the combustion space in which the fuel-air mixture is combusted, and a flow sleeve defining an annular space while surrounding the flame canister. The fuel injection nozzle is coupled to the front end of the combustor liner, and an ignition plug is coupled to the side wall of the combustor liner.

The transition piece is connected to the rear end of the combustion liner to transfer the combustion gas burned by the ignition plug toward the turbine. An outer wall of the transition piece is cooled by the compressed air supplied from the compressor to prevent the transition piece from being damaged by the high temperature of the combustion gas.

To this end, the transition piece is provided with cooling holes through which compressed air is injected into and cools inside of the transition piece and flows towards the combustor liner.

The cooling air used to cool the transition piece may flow into the annular space of the combustor liner, and is supplied as a cooling air to an outer wall of the combustor liner from the outside of the flow sleeve through cooling holes provided in the flow sleeve so that air flows may collide with each other.

The high-temperature and high-pressure combustion gas coming out of the combustor is supplied to the turbine 1300. The supplied high-temperature and high-pressure combustion gas impinges on the blades of the turbine and applies reaction force thereto while expanding, resulting in rotational torque. A portion of the rotational torque is transmitted to the compressor through the torque tube, and remaining portion which is an excessive torque is used to drive a generator or the like.

The turbine 1300 basically has a structure similar to the compressor. That is, the turbine 1300 also includes a turbine rotor 1320 similar to the compressor rotor of the compressor 1100. Accordingly, the turbine rotor 1320 includes a plurality of turbine rotor disks 1322 and a plurality of turbine blades 1324 arranged radially from each thereof. The turbine blades 1324 may also be coupled to the turbine rotor disk 1322 in a dovetail coupling manner or the like.

In addition, a plurality of turbine vanes 1314 fixed in a turbine casing 1312 are provided between the individual turbine blades 1324 of the turbine rotor disk 1322 to guide the direction of flow of the combustion gas that has passed through the turbine blades 1324. In this case, the turbine casing 1312 and the turbine vanes 1314 corresponding to fixing bodies may be collectively referred to as a turbine stator 1310 in order to distinguish them from the turbine rotor 1320 corresponding to a rotating body.

Referring to FIG. 3, the turbine vanes 1314 are fixedly mounted in the turbine casing by vane carriers 1316, which are endwalls coupled to the inner and outer ends of each of the turbine vanes 1314. On the other hand, at a position facing the outer end of each of the turbine blades 1324 rotating inside the turbine casing, a ring segment 1326 is mounted to form a predetermined gap with the outer end of the turbine blade 1324. That is, the gap between the ring segment 1326 and the outer end of the turbine blade 1324 is defined as a tip clearance.

Meanwhile, the turbine blade 1324 is directly exposed to combustion gas of high temperature and pressure. This exposure could lead to deformation of the turbine blade 1324, which in turn might cause subsequent damage to the turbine 1300. In order to prevent the deformation of the turbine blade due to the above high temperature, a branch passage 1800 may be formed between the compressor 1100 and the turbine 1300 to branch some of the air, which has a relatively lower temperature than the combustion gas, within the compressor 1100 for supply of the branched air to the turbine blade 1324.

The branch passage 1800 may be formed outside the compressor casing or may be formed inside the compressor casing by passing through the compressor rotor disks 1120. The branch passage 1800 may permit the compressed air branched from the compressor 1100 to be supplied into the turbine rotor disks 1322. The compressed air supplied into the turbine rotor disks 1322 may flow radially outward and then be supplied into the turbine blades 1324 to cool the turbine blades 1324. In addition, the branch passage 1800 formed outside the housing 1010 may permit the compressed air branched from the compressor 1100 to be supplied into the turbine casing 1312 so as to cool the inside of the turbine casing 1312. The branch passage 1800 may be provided with a valve 1820 in the middle thereof for selective supply of compressed air. The branch passage 1800 may also be connected with a heat exchanger (not shown) to further selectively cool compressed air before supply thereof.

Figure 4:
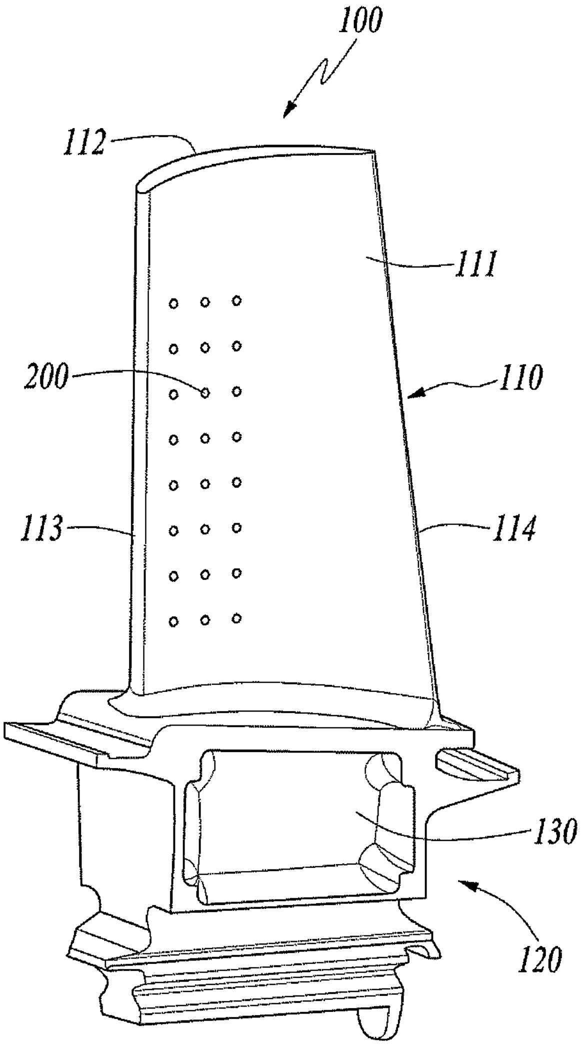
FIG. 4 is a perspective view illustrating one turbine blade according to the exemplary embodiment.

FIG. 4 is a perspective view illustrating one turbine blade according to the exemplary embodiment. In FIG. 4 and the following drawings, unlike in FIGS. 1 to 3, the turbine blade is indicated by reference numeral 100.

The turbine blade 100 includes an airfoil 110 formed on an upper portion of the turbine blade 100 and rotated by the pressure of combustion gas, and a root 120 formed integrally beneath the airfoil 110 and coupled to the turbine rotor disk 1322. The root 120 may have an inlet 130 formed therein so that a cooling fluid is supplied through the inlet 130 to a cooling passage formed inside the airfoil 110.

The airfoil 110 includes a suction side 112 formed convexly outward on one side thereof through which combustion gas is introduced, and a pressure side 111 formed concavely on the opposite side of the suction side. The front and rear edges where the pressure side 111 meets the suction side 112 meet form a leading edge 113 and a trailing edge 114, respectively. The airfoil 110 may have a cooling passage (not shown) through which the cooling air introduced through the inlet 130 flows.

The turbine blade 100 may have a plurality of cooling holes 200 formed on either the pressure side 111 or the suction side 112. The cooling fluid may be ejected through the cooling holes 200 and moves from upstream to downstream in the direction of the fluid flow, thereby creating a protective layer of air along an outer surface of the airfoil 110, which allows the outer surface of the airfoil 110 to be cooled by a so-called film cooling method. The cooling holes 200 may be arranged at predetermined intervals in rows and columns on the pressure side 111 or suction side 112 of the airfoil 110. The cooling holes 200 may be formed only near the leading edge 113 on the pressure side 111 or the suction side 112.

Figure 5:
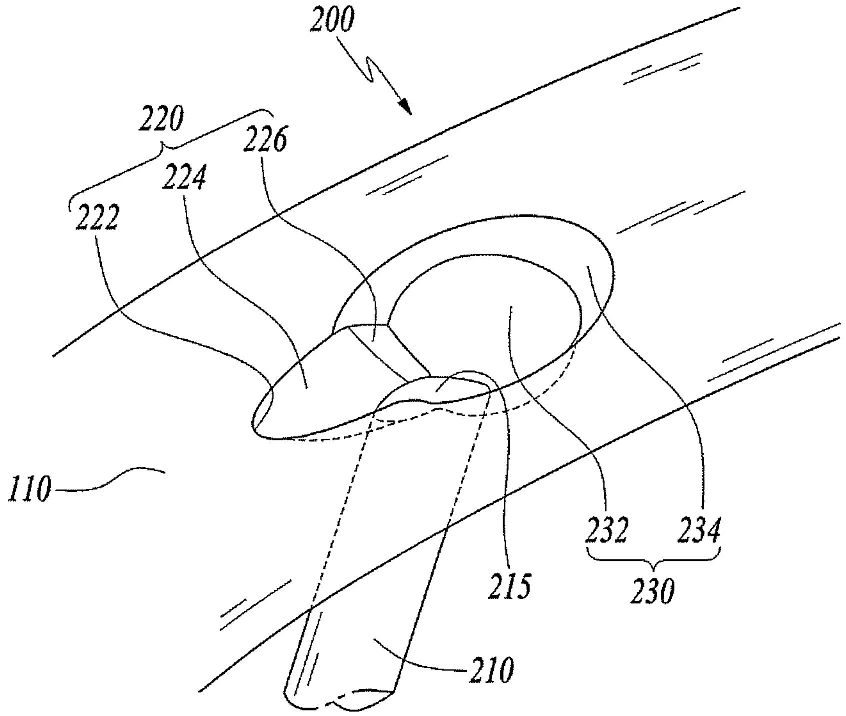
FIG. 5 is a perspective view illustrating a structure of one cooling hole according to the exemplary embodiment.
Figure 6:
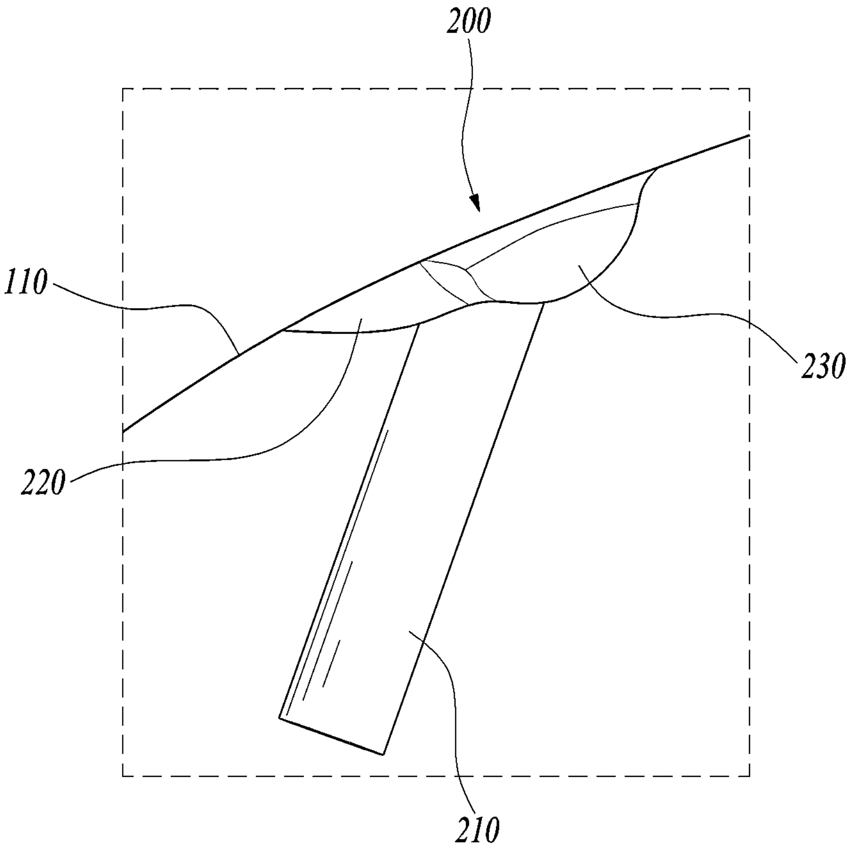
FIG. 6 is a side view illustrating the cooling hole structure in FIG. 5.
Figure 7:
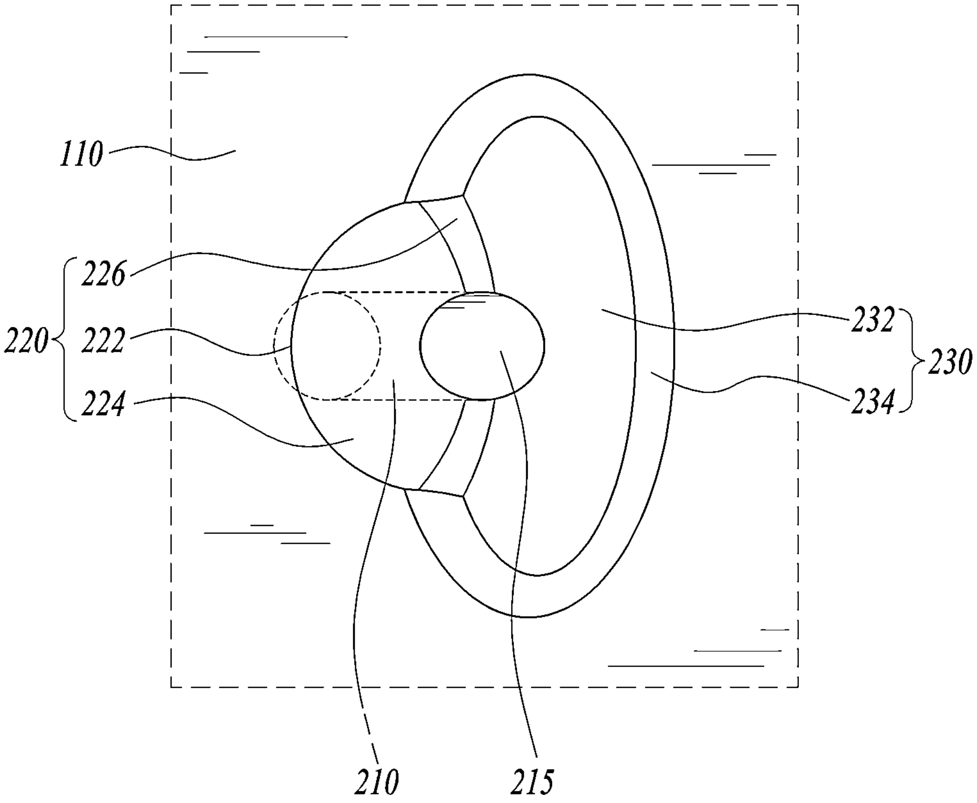
FIG. 7 is a top view illustrating the cooling hole structure in FIG. 5.
Figure 8:
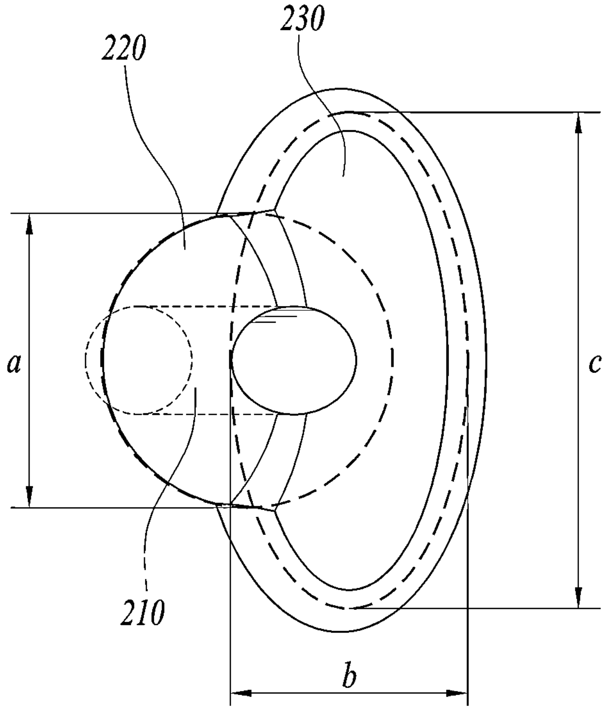
FIG. 8 is a view for comparing the size of the circle and the size of the ellipse in FIG. 7.

FIG. 5 is a perspective view illustrating a structure of one cooling hole according to the exemplary embodiment. FIG. 6 is a side view illustrating the cooling hole structure in FIG. 5. FIG. 7 is a top view illustrating the cooling hole structure in FIG. 5. FIG. 8 is a view for comparing the size of the circle and the size of the ellipse in FIG. 7.

Referring to FIG. 5, each of the cooling holes 200 in the turbine blade 100 according to the exemplary embodiment includes a through-hole 210 having a circular cross-section, a circular sink 220, and an elliptical sink 230. The through-hole 210 is angled outwardly toward the pressure side 111 or the suction side 112 starting from the cooling passage. The circular sink 220 is formed concavely with respect to the pressure side 111 or the suction side 112 in the vicinity of an upstream side of an exit of the through-hole. That is, the circular sink 220 may be located in a first position that includes the upstream side of the exit. The elliptical sink 230 is formed concavely with respect to the pressure side 111 or the suction side 112 in the vicinity of a downstream side of the exit of the through-hole. That is, the elliptical sink 230 may be located in a second position that includes the downstream side of the exit.

Hot combustion gas flows along the pressure side 111 and suction side 112 of the turbine blade 100, and cooling air having relatively low temperature flows outward through the through-hole 210, thereby cooling the turbine blade 100.

The through-hole 210 may have a circular cross-section and may be easily formed in a straight line by drilling.

The through-hole 210 may be inclined at an angle of 30 to 60 degrees with respect to the pressure side 111 or the suction side 112. The cooling air flowing out through the through-hole 210 is mixed with combustion gas and flows along the surfaces of the pressure side 111 and the suction side 112. As the through-hole 210 is not positioned perpendicularly, but rather at an incline of 30 to 60 degrees relative to the pressure side 111 or the suction side 112, it serves to enhance the film cooling effect produced by the cooling air.

The circular sink 220 may be formed concavely with respect to the pressure side 111 or the suction side 112 in the vicinity of the upstream side of the exit 215 of the through-hole 210. The circular sink 220 may be contoured in the form of an arc of approximately or exactly half a circle or more. The circular sink 220 may create a horseshoe vortex in the combustion gas flowing along the surfaces of the pressure side 111 and the suction side 112.

The circular sink 220 may include a first concave curved part 224 formed concavely around the upstream side of the exit 215 of the through-hole 210 and having an arc rim, and a curved connection part 226 connected to the elliptical sink 230 from one side of the first concave curved part. The circular sink 220 may intersect with a first outer circumference section of the exit 215 located in the upstream side of the exit.

The first concave curved part 224 may have a shape that is concave from the surface of the pressure side 111 or the suction side 112 while having a rim in the form of an arc of 180 degrees or more so as to meet the upstream side of the exit 215 of the through-hole 210.

The curved connection part 226 may consist of a pair of curved connection parts that extend from the first concave curved part 224 and meet the elliptical sink 230 at both left and right sides of the exit 215 of the through-hole 210.

An upstream edge 222 where the first concave curved part 224 meets an upstream surface may be bent to create a vortex. That is, at least the upstream rim of the first concave curved part 224 on the surface of the pressure side 111 or the suction side 112 may not have a streamlined shape that is smoothly connected from the surface, but may be formed such that the longitudinal cross-sectional curve of the first concave curved part 224 is bent at an acute angle with respect to the surface. Forming the upstream edge 222 on the rim of the first concave curved part 224 may allow the cooling air to create a vortex while flowing to the first concave curved part 224, thereby increasing a cooling effect by the cooling air.

The elliptical sink 230 may be formed concavely with respect to the pressure side 111 or the suction side 112 in the vicinity of the downstream side of the exit 215 of the through-hole 210. That is, the elliptical sink 230 may have a curved shape that is concave from the surface of the pressure side 111 or the suction side 112 so as to meet the exit 215.

The elliptical sink 230 may have a major axis perpendicular to the direction of flow of the fluid. Since the elliptical sink 230 is elongated widthwise, the cooling air coming out through the exit 215 may be diffused and the combustion gas flowing along the circular sink 220 may also be diffused in the elliptical sink 230.

The elliptical sink 230 may include a second concave curved part 232 formed concavely around the downstream side of the exit 215 of the through-hole 210 and having an elliptical rim, and a convex curved part 234 connected to a downstream surface from the rim of the second concave curved part. The elliptical sink 230 may intersect with a second outer circumference section of the exit 215 located in the downstream side of the exit 215.

As illustrated in FIGS. 7 and 8, the second concave curved part 232 may have an elliptical rim elongated widthwise. The second concave curved part 232 may be connected to the curved connection part 226 together with the exit 215 of the through-hole 210.

The convex curved part 234 may have a curved shape that is convex upward from the periphery of the second concave curved part 232 to the surface of the pressure side 111 or the suction side 112. The convex curved part 234 may be contoured in the form of an ellipse, just like the second concave curved part 232.

The convex curved part 234 has a curved shape that is convex upward for smooth connection to the surface of the pressure side 111 or the suction side 112, which allows the cooling air mixed with the combustion gas to flow smoothly.

As illustrated in FIG. 8, the circular sink 220 may have a diameter (a) that is larger than the minor axis (b) and smaller than the major axis (c) of the elliptical sink 230. In FIG. 8, a virtual circle is indicated by a dotted line at the contour of the circular sink 220, and a virtual ellipse is indicated by another dotted line in the middle of the convex curved part 234 of the elliptical sink 230.

The diameter (a) of the circular sink 220 may be slightly larger than the minor axis (b) of the elliptical sink 230, and the major axis (c) of the elliptical sink 230 may be considerably larger than the diameter (a) of the circular sink 220.

As illustrated in FIG. 8, it is preferable that the exit 215 of the through-hole 210 be disposed inside both the virtual circle of the circular sink 220 and the virtual ellipse of the elliptical sink 230. Accordingly, the cooling air coming out of the through hole 210 may be introduced into the circular sink 220 to create a vortex, and may flow along the surface of the pressure side 111 or the suction side 112 while diffusing in the elliptical sink 230 to form an air curtain.

The major axis (c) of the elliptical sink 230 may be 3 to 4 times the diameter of the through-hole 210. If the major axis (c) of the elliptical sink 230 is too small, the diffusion effect of the cooling air cannot be expected. On the contrary, if the major axis (c) of the elliptical sink 230 is too large, the elliptical sink 230 may be unnecessarily too large to effectively create the diffusion effect of the cooling air.

As illustrated in FIG. 6, the lowest depth point of the elliptical sink 230 measured from the surface of the turbine blade 100 may be deeper than the lowest depth point of the circular sink 220 measured from the surface of the turbine blade 100. Since the elliptical sink 230 has a larger area than the circular sink 220, the lowest depth point of the elliptical sink 230 is naturally deeper than the lowest depth point of the circular sink 220.

Figure 9A:
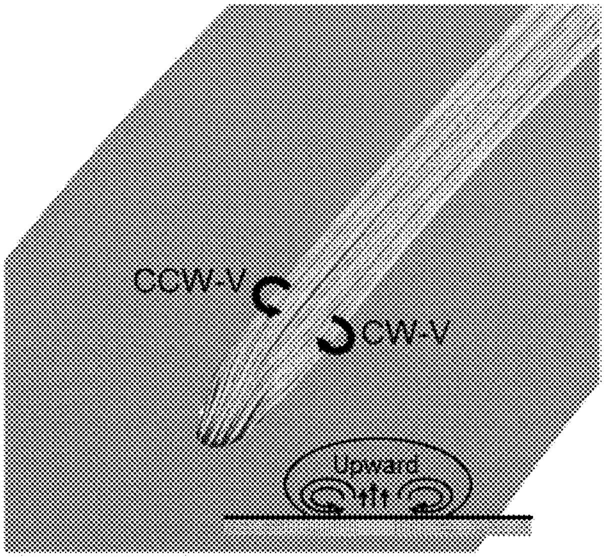
FIGS. 9A and 9B are partial perspective views illustrating a streamline of cooling air flowing through a cooling hole in the form of a simple cylinder (FIG. 9A) and a streamline of cooling air flowing through the cooling hole of FIG. 5 (FIG. 9B), respectively.
Figure 9B:
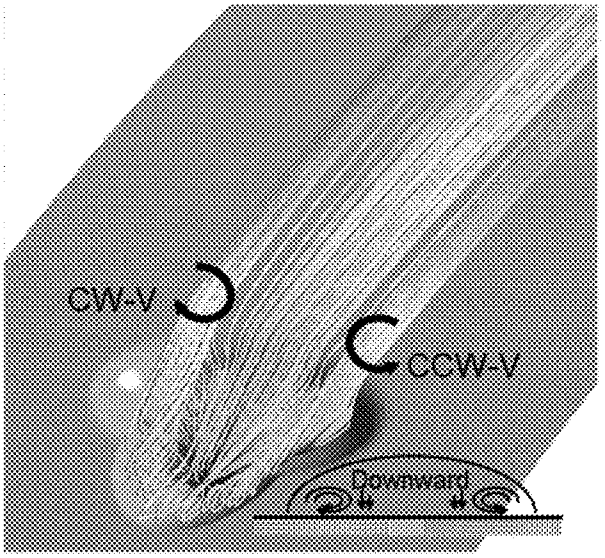
Figure 10A:
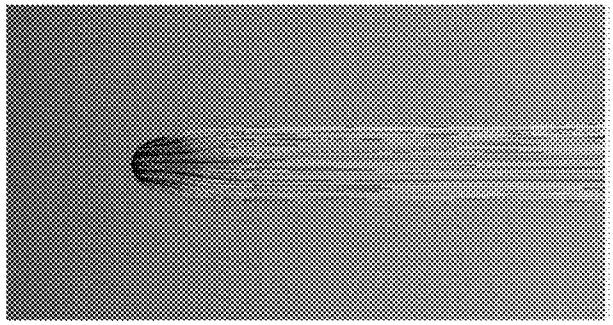
FIGS. 10A and 10B are top views illustrating a streamline of cooling air flowing through a cooling hole in the form of a simple cylinder (FIG. 10A) and a streamline of cooling air flowing through the cooling hole of FIG. 5 (FIG. 10B), respectively.
Figure 10B:
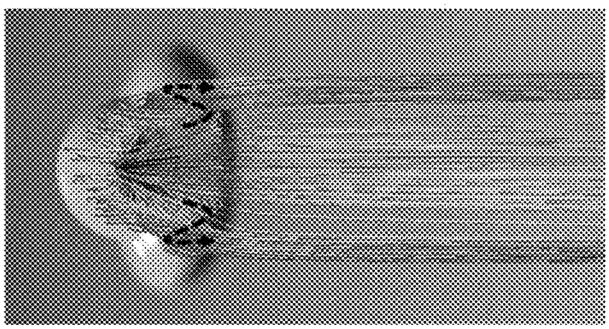

FIGS. 9A and 9B are partial perspective views illustrating a streamline of cooling air flowing through a cooling hole in the form of a simple cylinder (FIG. 9A) and a streamline of cooling air flowing through the cooling hole of FIG. 5 (FIG. 9B), respectively. FIGS. 10A and 10B are top views illustrating a streamline of cooling air flowing through a cooling hole in the form of a simple cylinder (FIG. 10A) and a streamline of cooling air flowing through the cooling hole of FIG. 5 (FIG. 10B), respectively.

FIGS. 9A and 10A illustrate that a cooling hole having a simple circular cross-section is formed through the surface of the turbine blade at an angle. In this case, it can be seen that the cooling air flowing out through the cooling hole has a relatively narrow lateral width. In particular, on the basis of the direction of flow of cooling air, a counterclockwise vortex (CCW-V) is created on the left and a clockwise vortex (CW-V) is created on the right, resulting in an upward flow of the cooling air in the middle. This will reduce the film cooling effect against the purpose of forming an air curtain on the surface of the turbine blade.

In FIGS. 9B and 10B, the cooling air, which flows out through the cooling hole of the exemplary embodiment having the circular sink and the elliptical sink formed around the exit of the through-hole, not only facilitates the creation of vortex in the circular sink, but also flows while diffusing from side to side by the elliptical sink. In particular, on the basis of the direction of flow of cooling air, a clockwise vortex (CW-V) is formed on the left and a counterclockwise vortex (CCW-V) is formed on the right, resulting in a downward flow of the cooling air in the middle. This can increase the film cooling effect by forming a thin air curtain on the surface of the turbine blade.

As is apparent from the above description, according to the turbine blade and the gas turbine including the same of the exemplary embodiments described above, it is possible to enhance film cooling performance by improving the shape of the plurality of cooling holes formed on the pressure side or the suction side of the turbine blade.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A turbine blade having a leading edge, a trailing edge, a pressure side, and a suction side and having a cooling passage formed therein, the turbine blade comprising:

a plurality of cooling holes formed on the pressure side or the suction side, wherein each of the cooling holes comprises:

a through-hole having a circular cross-section and angled outwardly toward the pressure side or the suction side from the cooling passage;

a circular sink formed concavely with respect to the pressure side or the suction side and located in a first position that includes an upstream side of an exit of the through-hole; and an elliptical sink formed concavely with respect to the pressure side or the suction side and located in a second position that includes a downstream side of the exit of the through-hole, wherein an upstream edge of the circular sink where the circular sink meets an upstream surface has an upstream end located relatively more upstream than the upstream side of the exit of the through-hole, wherein the circular sink comprises:

a first concave curved part formed concavely around the upstream side of the exit of the through-hole and having an arc rim, the first concave curved part meeting the upstream surface at the upstream edge; and a curved connection part connected to the elliptical sink from one side of the first concave curved part.

2. The turbine blade according to claim 1, wherein the through-hole is inclined at an angle of 30 to 60 degrees with respect to the pressure side or the suction side.

3. The turbine blade according to claim 1, wherein the upstream edge where the first concave curved part meets an upstream surface is bent to create a vortex.

4. The turbine blade according to claim 1, wherein the elliptical sink has a major axis perpendicular to a direction of flow of fluid.

5. The turbine blade according to claim 1, wherein the elliptical sink comprises:

a second concave curved part formed concavely around the downstream side of the exit of the through-hole and having an elliptical rim; and a convex curved part connected to a downstream surface from the elliptical rim of the second concave curved part.

6. The turbine blade according to claim 1, wherein the circular sink has a diameter that is larger than a minor axis and smaller than a major axis of the elliptical sink.

7. The turbine blade according to claim 6, wherein the major axis of the elliptical sink is 3 to 4 times the diameter of the through-hole.

8. The turbine blade according to claim 1, wherein a lowest depth point of the elliptical sink from the surface of the turbine blade is deeper than a lowest depth point of the circular sink from the surface of the turbine blade.

9. A gas turbine comprising:

a compressor configured to suck and compresses outside air;

a combustor configured to mix fuel with the air compressed by the compressor to burn a mixture thereof; and a turbine having turbine blades mounted in a turbine casing, the turbine blades being rotated by combustion gas discharged from the combustor, wherein each of the turbine blades comprises a plurality of cooling holes formed on a pressure side or a suction side, and wherein each of the cooling holes comprises:

a through-hole having a circular cross-section and angled outwardly toward the pressure side or the suction side from a cooling passage;

a circular sink formed concavely with respect to the pressure side or the suction side and located in a first position that includes an upstream side of an exit of the through-hole; and an elliptical sink formed concavely with respect to the pressure side or the suction side and located in a second position that includes a downstream side of the exit of the through-hole, wherein an upstream edge of the circular sink where the circular sink meets an upstream surface has an upstream end located relatively more upstream than the upstream side of the exit of the through-hole, wherein the circular sink comprises:

a first concave curved part formed concavely around the upstream side of the exit of the through-hole and having an arc rim, the first concave curved part meeting the upstream surface at the upstream edge; and a curved connection part connected to the elliptical sink from one side of the first concave curved part.

10. The gas turbine according to claim 9, wherein the through-hole is inclined at an angle of 30 to 60 degrees with respect to the pressure side or the suction side.

11. The gas turbine according to claim 9, wherein the upstream edge where the first concave curved part meets an upstream surface is bent to create a vortex.

12. The gas turbine according to claim 9, wherein the elliptical sink has a major axis perpendicular to a direction of flow of fluid.

13. The gas turbine according to claim 9, wherein the elliptical sink comprises:

a second concave curved part formed concavely around the downstream side of the exit of the through-hole and having an elliptical rim; and a convex curved part connected to a downstream surface from the elliptical rim of the second concave curved part.

14. The gas turbine according to claim 9, wherein the circular sink has a diameter that is larger than a minor axis and smaller than a major axis of the elliptical sink.

15. The gas turbine according to claim 14, wherein the major axis of the elliptical sink is 3 to 4 times the diameter of the through-hole.

16. The gas turbine according to claim 9, wherein a lowest depth point of the elliptical sink from the surface of the turbine blade is deeper than a lowest depth point of the circular sink from the surface of the turbine blade.

* * * * *